US007634873B2

United States Patent
Ruppert et al.

(10) Patent No.: US 7,634,873 B2
(45) Date of Patent: Dec. 22, 2009

(54) COMPOSITE UPPER DOOR SASH

(75) Inventors: Gerald Y. Ruppert, Lake Orion, MI (US); Peter John Ellis, Rochester Hills, MI (US); James R. Drouillard, Lake Orion, MI (US)

(73) Assignee: Magna International, Inc., Aurora (CA)

( * ) Notice: Subject to any disclaimer, the term of this patent is extended or adjusted under 35 U.S.C. 154(b) by 422 days.

(21) Appl. No.: 11/432,889

(22) Filed: May 12, 2006

(65) Prior Publication Data
US 2007/0261313 A1 Nov. 15, 2007

(51) Int. Cl.
E60J 5/04 (2006.01)
(52) U.S. Cl. ...................... 49/502; 296/146.5
(58) Field of Classification Search .................. 49/502; 296/146.1, 146.5
See application file for complete search history.

(56) References Cited

U.S. PATENT DOCUMENTS

| 2,567,153 | A | * | 9/1951 | Jackson et al. ................. 49/166 |
| 4,644,699 | A | * | 2/1987 | Chandler et al. .............. 49/502 |
| 4,908,989 | A | * | 3/1990 | Omura et al. .................. 49/441 |
| 5,107,624 | A | * | 4/1992 | Passone ........................ 49/502 |
| 5,465,531 | A | * | 11/1995 | Herrmeyer .................... 49/463 |
| 5,557,890 | A | * | 9/1996 | Levy et al. ..................... 49/502 |
| 5,867,942 | A | * | 2/1999 | Kowalski ...................... 49/502 |
| 5,894,706 | A | * | 4/1999 | Herbst ........................ 52/782.1 |
| 5,907,897 | A | * | 6/1999 | Hisano ......................... 29/434 |
| 5,927,021 | A | * | 7/1999 | Kowalski et al. ............... 49/502 |
| 6,036,255 | A | * | 3/2000 | Lester et al. .............. 296/146.1 |
| 6,086,139 | A | * | 7/2000 | Heim et al. ............... 296/146.5 |
| 6,223,472 | B1 | * | 5/2001 | Ishikawa et al. .............. 49/502 |
| 6,758,512 | B2 | * | 7/2004 | Dobbs ...................... 296/146.5 |
| 6,820,919 | B2 | * | 11/2004 | Florentin et al. ......... 296/146.6 |
| 6,886,881 | B1 | * | 5/2005 | Henderson et al. ....... 296/146.2 |
| 6,920,720 | B2 | * | 7/2005 | Sommer et al. ............... 49/502 |
| 6,969,101 | B2 | * | 11/2005 | Lynam et al. ............... 296/1.11 |
| 6,988,759 | B2 | * | 1/2006 | Fin et al. .................. 296/146.7 |
| 7,093,393 | B2 | * | 8/2006 | Hock et al. .................... 49/502 |
| 2004/0049989 | A1 | * | 3/2004 | Florentin et al. .............. 49/502 |
| 2005/0110298 | A1 | * | 5/2005 | Fin et al. .................. 296/146.5 |
| 2006/0156632 | A1 | * | 7/2006 | Ruppert et al. ................ 49/502 |
| 2008/0127569 | A1 | * | 6/2008 | Boddy et al. .................. 49/502 |

* cited by examiner

*Primary Examiner*—Jerry Redman
(74) *Attorney, Agent, or Firm*—Warn Partners, P.C.; Marc Luddy

(57) ABSTRACT

The present invention relates to a door assembly which has a lower door assembly and an upper door assembly, and the upper door assembly and a lower door assembly can be connected. In addition, the upper door assembly is at least partially made of composite materials. Thus, the upper door assembly can be completely constructed with composite materials or it can be constructed of a hybrid material which consists of composite materials and steel. Furthermore, the door assembly can have trim molding integrated into the upper door assembly during the molding process. In the alternative, the door assembly could have an upper door assembly where attachment areas are molded into the upper door assembly which will allow for trim molding to be easily attached to the upper door assembly.

14 Claims, 4 Drawing Sheets

COMPOSITE UPPER DOOR SASH

FIELD OF THE INVENTION

The present invention relates to an upper door assembly constructed of at least a portion of composite material.

BACKGROUND OF THE INVENTION

Many vehicles today have has been formed. The reason an additional step is required is that the vehicle's doors are made of sheet metal and the trim molding needs to be mechanically attached to the sheet metal. Due to the additional manufacturing step, the cost of the manufacturing process is greatly increased.

Furthermore, when a vehicle's door is painted the entire door, the interior and the exterior, must pass through the paint line. Thus, the interior of the vehicle's door is the same color as the exterior of the door. This is undesirable because the occupant of the vehicle can see the color of the vehicle's exterior on the interior of the vehicle's door. Thus, the manufacturer has to add an additional step in order to paint over, or black out, the exterior color on the interior of the vehicle's door. The portion of the interior of the vehicle's door that has the exterior color that can be seen by the vehicle's occupant and that is covered is known in the industry as a "skunk strip." This additional manufacturing step to cover the skunk strip also adds additional manufacturing costs.

Therefore it would be ideal to construct a door assembly using composite materials where the trim could be integrated with the door assembly, thus completely eliminating the manufacturing step to mechanically attach the trim to the vehicle's door. In the alternative, it would be ideal to have a door assembly where attachment means for the trim are integrated into the door assembly so that the trim molding can be easily connected to the door assembly. Thus, even though a manufacturing step is needed to attach the trim to the vehicle's door, the manufacturing process is more efficient because the trim more easily attaches to attachment area of the vehicle's door. It would also be ideal to have a door assembly where an upper door assembly is constructed of composite materials that can be connected to a lower door assembly that is made of metal, composite material or a combination of metal and composite material.

SUMMARY OF THE INVENTION

The present invention relates to a door assembly which has a lower door assembly and an upper door assembly, and the upper door assembly and a lower door assembly can be connected. In addition, the upper door assembly is at least partially made of composite materials. Thus, the upper door assembly can be completely constructed with composite materials or it can be constructed of a hybrid material which consists of composite materials and steel. Furthermore, the door assembly can have trim molding integrated into the upper door assembly during the molding process. In the alternative, the door assembly could have an upper door assembly where attachment areas are molded into the upper door assembly which will allow for trim molding to be easily attached to the upper door assembly.

The upper door assembly can also have a means of attachment so that the upper door assembly can be connected to the lower door assembly. Likewise, the lower door assembly can have a means of attachment so that it can be connected to the upper door assembly. In addition, the upper door assembly can have an insert on the interior of the upper door assembly in order to cover the exterior paint that can be seen by the vehicle's occupant on the vehicle's interior. It is also possible to have the upper door assembly where similar parts have variable thicknesses, such that areas of the upper door assembly are only as thick as they need to be in order to comply with any load bearing requirements for that particular area.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
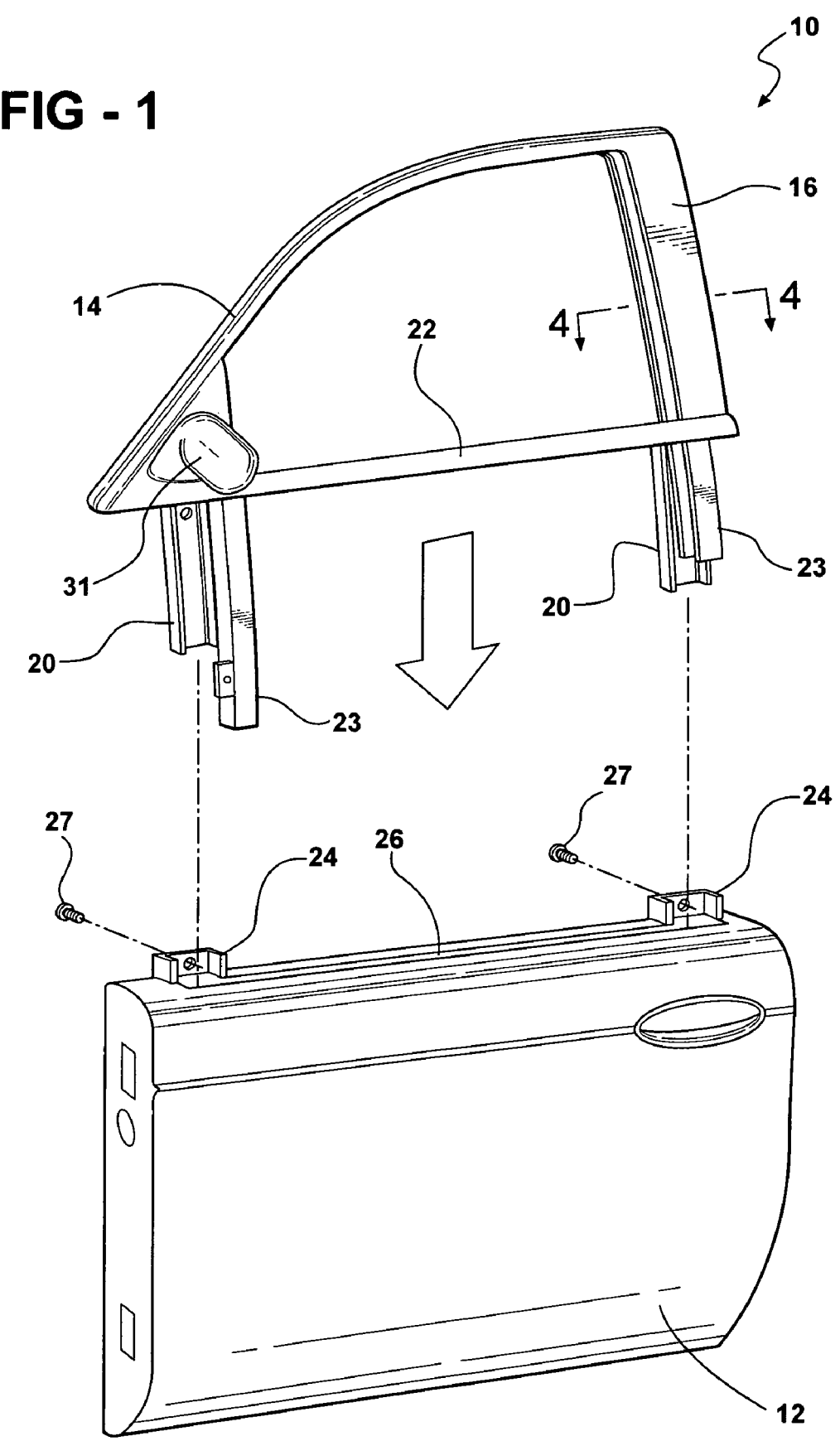
FIG. 1 is an exploded perspective view of a preferred embodiment of the vehicle's upper door assembly.
Figure 2:
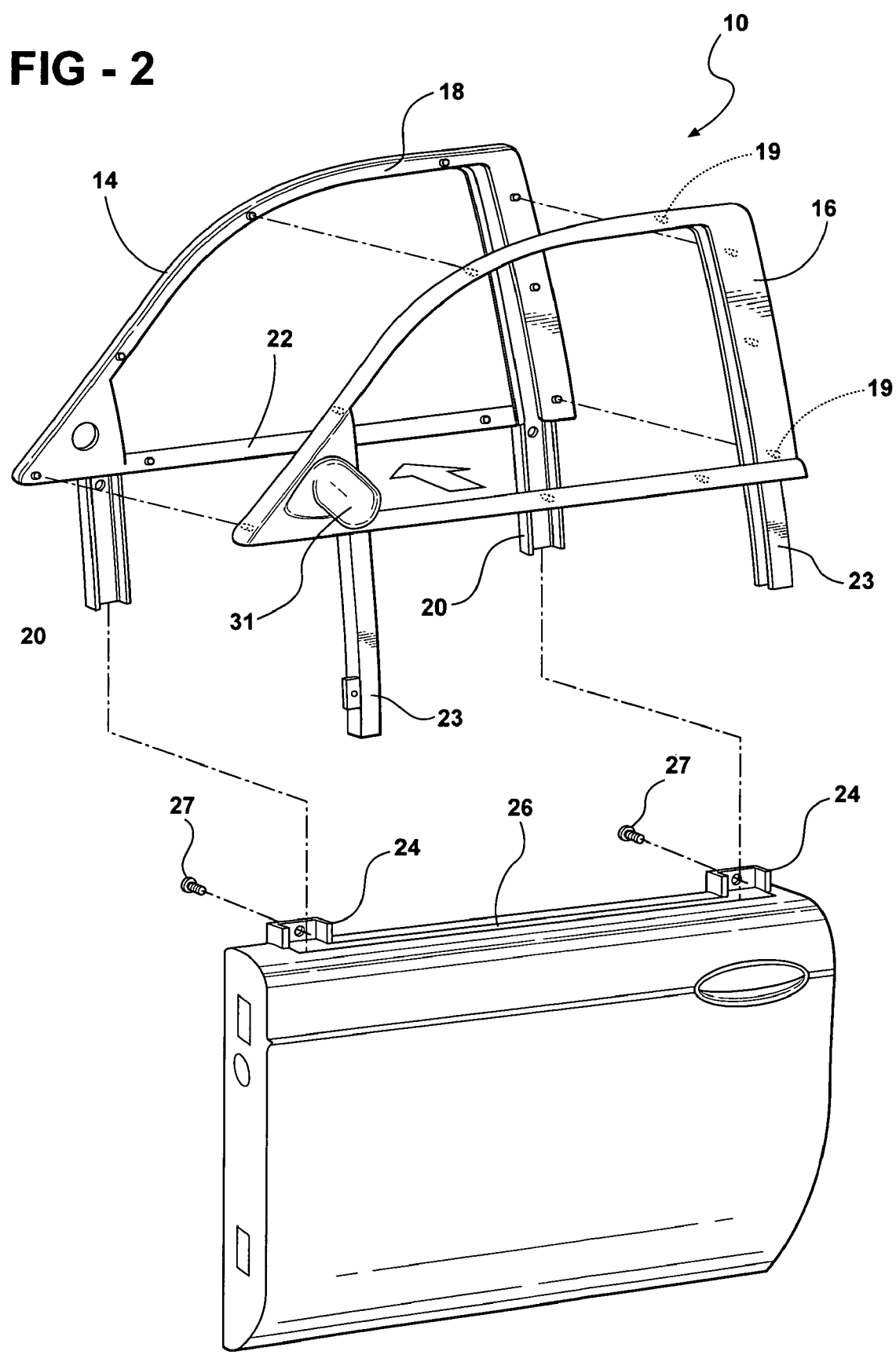
FIG. 2 is an exploded perspective view of an alternate embodiment of the vehicle's upper door assembly.
Figure 3:
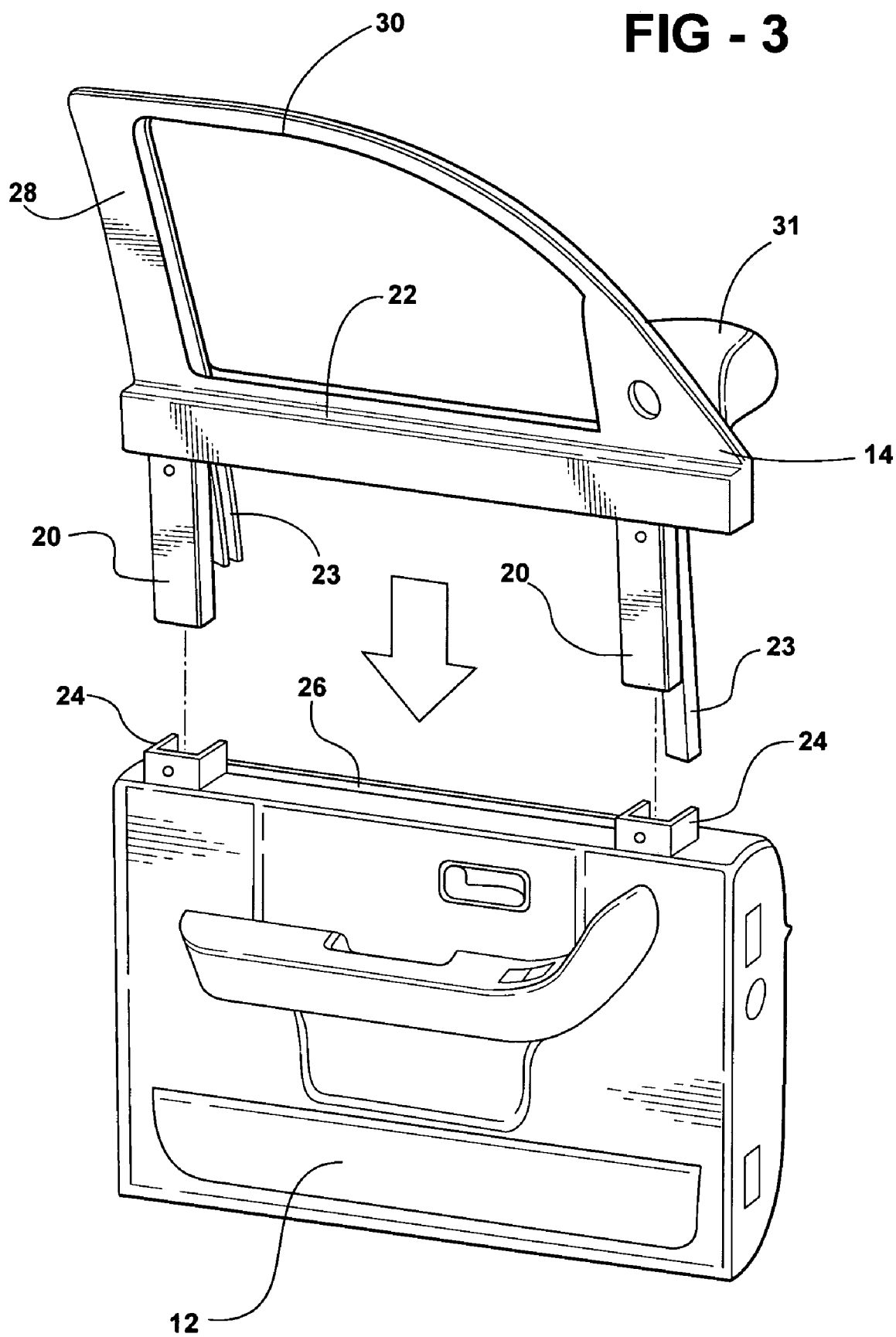
FIG. 3 is an exploded perspective view of the interior of the vehicle's upper door assembly.

Referring to FIGS. 1-3, a door assembly 10 has a lower door assembly 12 and an upper door assembly 14. In the preferred embodiment the upper door assembly 14 is constructed using composite materials. An example of the preferred composite material for the upper door assembly 14 is a glass filled material. Furthermore, examples of a glass filled material that can be used is polypropylene or polyester. It is preferred that the composite material consist of 40% long glass. The glass fibers are randomly placed in the composite material because the upper door assembly 14 is injection molded and thus the material is compounded. In addition, the exterior of the upper door assembly 14 can be made of a TPO material to enhance the aesthetic look of the door assembly 10. In an alternate embodiment, the upper door assembly 14 is made of a hybrid material which is a combination of composite material and metal. In this embodiment, a composite material, such as polypropylene or polyester are used in combination with a metal core.

The upper door assembly 14 can be molded with a trim molding 16 so that the upper door assembly 14 and the trim molding 16 are integrated. In other words, the trim molding 16 can be pre-manufactured and put into the injection molding machine so that when the composite material is injected into the injection molding machine to form the upper door assembly 14, the trim molding 16 bonds to upper door assembly 14. It is also possible to pre-manufacture the upper door assembly 14 and place the upper door assembly 14 into an injection molding machine and inject the material for the trim molding 16 into the molding machine so that the trim molding 16 will bond to the upper door assembly 14. Either way, the trim molding 16 is integrated to the upper door assembly 14 during the molding process, thus eliminating an additional manufacturing step to attach the trim molding 16 to the door assembly 10.

In an alternate embodiment, the upper door assembly 14 is molded with an attachment location 18 on the upper door assembly 14 structure. Thus, after the upper door assembly 14 is removed from the injection molding machine, the pre-manufactured trim molding 16 can be attached to the upper door assembly 14 at the attachment location 18. Even though a post-molding manufacturing step is required to attach the trim molding 16 to the upper door assembly 14, the attachment process can be completed more efficiently because the attachment location 18 creates an easier means of attachment. For example, the trim molding 16 can include a fastener 19 which extends from the attaching side of trim molding 16. The attachment location 18 can then have a corresponding number of receiving holes 21 that accept the fasteners 19. Then the trim molding 16 to the upper door assembly 14 are mechanically attached when the fasteners 19 are properly aligned with the receiving holes 21. Another alternate embodiment for attaching the trim molding 16 to the upper door assembly 14 works in a similar manner, except that the attachment location 18 has the fasteners 19 and the trim molding 16 has the receiving holes 21.

The upper door assembly 14 has at least one upper connection point 20 at the base 22 of the upper door assembly 14. Likewise, the trim molding 16 can have an upper connection point 23, but this feature is not required. However, by including an upper connection point 23, the trim molding 16 can be more securely fastened to the door assembly 10. The lower door assembly 12 also has at least one lower connection point 24 at the top 26 of the lower door assembly 12. Therefore, the lower door assembly 12 and the upper door assembly 14 can be connected at the upper connection point 20 and the lower connection point 24. In the preferred embodiment, the upper connection point 20, 23 is an extension that extends from the base 22 towards the lower door assembly 12. Also in the preferred embodiment, the lower connection point 24 is a receiver, such that the extension can be placed into the receiver, thus connecting the lower door assembly 12 and the upper door assembly 14. Once the extension is placed into the receiver the connection between the lower door assembly 12 and the upper door assembly 14 can be secured by extending a bolt 27 through the receiver and the extension. However, any form of securing the mechanical connection between the lower door assembly 12 and the upper door assembly 14 could be used.

In another alternate embodiment, the upper connection point 20 is the receiver, and the lower connection point 24 is the extension. Thus, the upper door assembly 14 and the lower door assembly 12 can be connected in a similar manner as described above. However, depending on the shape of the door assembly 10, an extension that extends from the lower door assembly 12 into the upper door assembly 14 can cause obstruction for the window (not shown) of the upper door assembly 14. For example, if the upper door assembly 14 has an angled shape as shown in FIGS. 1-3, it can be difficult to extend the extension into the upper door assembly 14 without interfering with the window. The reason for this is that the extension could not enter the upper door assembly 14 on the edge because the angled shape does not allow the extension to extend far enough into the upper door assembly in order to provide sufficient stability between the upper door assembly 14 at the edge and the lower door assembly 12. Thus, the extension would have to be moved towards the center of the upper door assembly, which would then interfere with the window. If the upper door assembly 14 has a more square or box shape then the extension would be able to extend into the upper door assembly 14 so that the upper door assembly 14 can be secured with the lower door assembly 12. However, the extension can still interfere with the window when the upper door assembly 14 has this design. Furthermore, the upper connection point 20 and the lower connection point 24 could be any type of design that would allow the lower door assembly 12 and the upper door assembly 14 to be connected and form one piece.

The upper door assembly 14 can also include an interior attachment area 26 where an insert 28 is integrated into the upper door assembly 14. Thus, the insert 28 is pre-manufactured and put into the injection molding machine so that when the material for the upper door assembly 14 is injected into the injection molding machine and formed, the insert 28 and the upper door assembly 14 are integrated. In the alternative, the upper door assembly 14 is pre-manufactured and placed in the molds, and when the material for the insert 28 is injected, the upper door assembly 14 is integrated with the insert 28. The insert 28 is on the interior of the upper-door assembly 14 and is placed around the window edges 30 thus, the insert 28 covers the interior portions of the upper door assembly 14 that would otherwise be seen by the vehicle's occupant. In other words, if the insert 28 is not placed on the upper door assembly 14, there is a portion of the upper door assembly 14 that would have the same color as the exterior portion of the upper door assembly 14. If the insert 28 is not integrated with the upper door assembly 14, then the manufacturing process of the upper door assembly 14 requires an additional manufacturing step because the manufacturer would "black out" the portion of the upper door assembly that has the same color as the exterior of the upper door assembly 14. It is also possible to attach the insert 28 in a similar manner as the trim molding 16 as shown in FIG. 2. Thus, the insert 28 could be formed with fasteners and the upper door assembly 14 could have receivers that the fasteners are inserted into. In addition, the insert 28 could have receivers and the upper door assembly could have the fasteners that are inserted into the insert 28. Again, even though an additional manufacturing step is required, the assembly can be done quickly because of the easy attachment of the insert 28 to the upper door assembly 14. Thus, the insert 28 covers the exterior color on the interior of the upper door assembly 14 and there is no need for an additional manufacturing step to add a "skunk strip."

Referring to FIGS. 1-3, a mirror-base 31 can be integrated into the upper door assembly 14 in a similar manner as the trim molding 16. For example, the mirror-base 31 can be pre-manufactured and placed in the injection molder, and then when the material for the upper door assembly 14 is injected, the material will bond to the mirror-base 31. Thus, the mirror-base 31 will be integrated with the upper door assembly 14. Another example would be to pre-manufacture the upper door assembly 14 and place the upper door assembly 14 in an injection molder, and inject the mirror-base 31 material so that it will bond to the upper door assembly 14. The mirror-base 31 can extend from the door assembly 14. The mirror-base 31 can extend from the door assembly 14 such that a mirror-head (not shown) can be attached directly to the mirror-base 31. In an alternate embodiment, the upper door assembly 14 can be formed in a way that creates a mirror attachment area. Then a complete mirror mechanism or the attachment mechanism for a mirror can be connected to the mirror attachment area.

Figure 4:
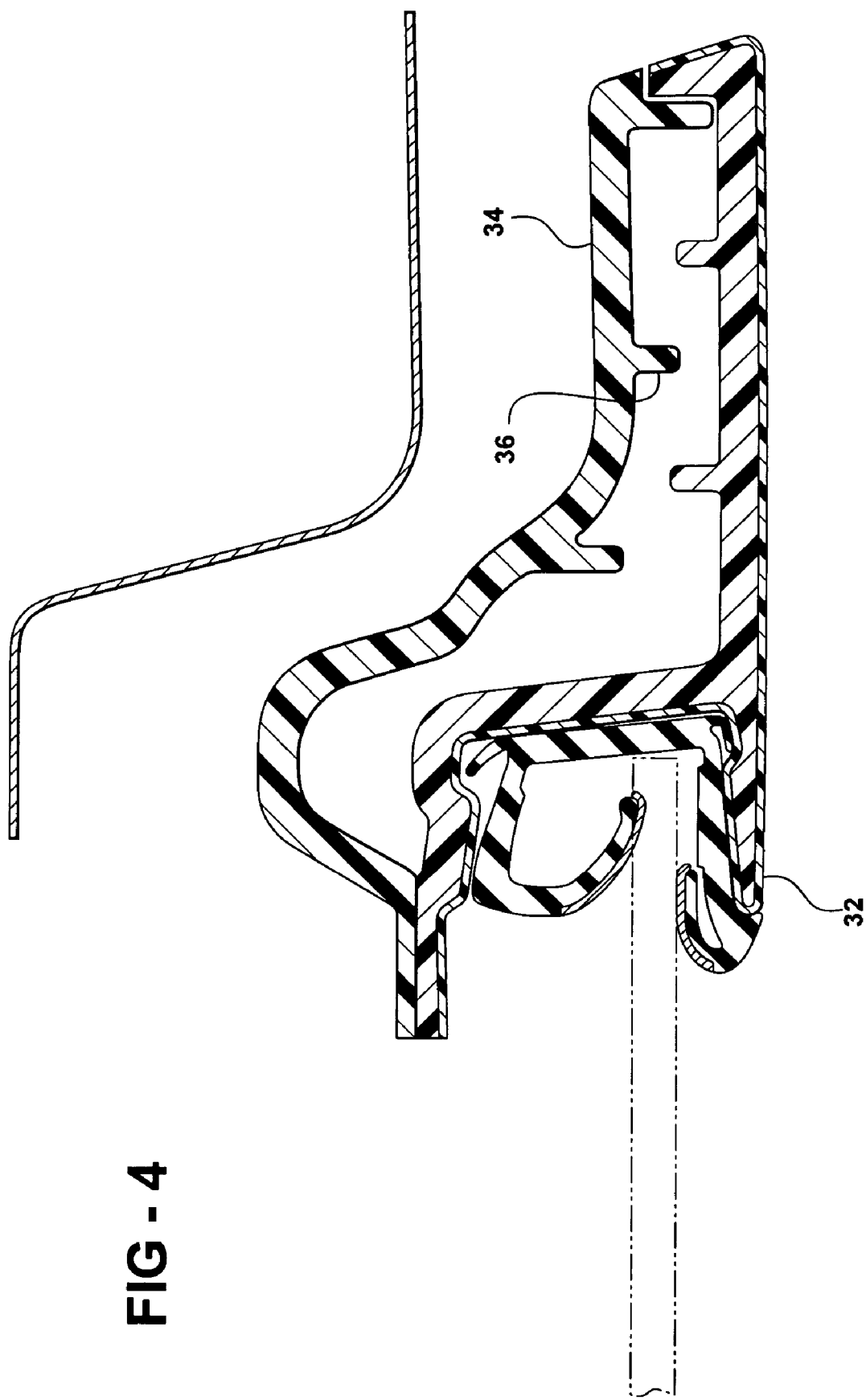
FIG. 4 is a cross-sectional view across line A-A of FIG. 1.

Referring to FIG. 4, examples of the upper door assembly 14 made out of composite material is shown. For example, the B-pillar 32 of the upper door assembly 14 can be constructed of composite materials. In order for the B-pillar 32 to have the required load bearing characteristics, the B-pillars 32 structure may be required to be thicker than the structure of a door assembly using sheet metal. However, this additional thickness does not require the door assembly to be larger than a door assembly made of sheet metal because the design of the sheet metal B-pillar had unused interior space. Thus, the additional thickness of the B-pillar 32 made of composite material can occupy the previously unused interior space. Furthermore, the B-pillar 32 can be constructed in a way that the thicknesses can vary throughout the structure. For example, if a first portion 34 of the B-pillar 32 needs to be a certain thickness in order to comply with a load bearing requirement, it can be constructed to that thickness. However, if a second portion 36 of the B-pillar 32 can satisfy the load bearing requirements for that particular portion of the B-pillar at a reduced thickness, then the composite material can be formed to that reduced thickness. By contrast, if the door assembly 10 were constructed of sheet metal, the thicknesses throughout the entire structure have to be the same since sheet metal does not have the forming capabilities of composite materials.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door assembly comprising:
    a lower door assembly;
    an upper door assembly, wherein said upper door assembly is at least partially made of a composite material;
    a trim molding connected to said upper door assembly;
    an extension formed as part of said upper door assembly;
    an extension formed as part of said trim molding, wherein said extension formed as part of said upper door assembly and said extension formed as part of said trim molding are inserted into said lower door assembly to individually secure said trim molding and said upper door assembly to said lower door assembly; and
    one or more fasteners between said trim molding and said upper door assembly removably connecting said trim molding to said upper door assembly.

2. The door assembly of claim 1, wherein said trim molding is integrated with said upper door assembly.

3. The door assembly of claim 1, wherein said upper door assembly has an attachment location molded into an exterior side of said upper door assembly.

4. The door assembly of claim 1, wherein said lower door assembly has at least one means of attachment on a side that contacts said upper door assembly.

5. The door assembly of claim 1 further comprising an insert, wherein said insert is integrated with said upper door assembly, and said insert covers at least a portion of an interior of said upper door assembly.

6. The door assembly of claim 1, wherein said upper door assembly has an attachment location molded into an interior side of said upper door assembly.

7. The door assembly of claim 1, further comprising said upper door assembly to have variable thicknesses.

8. A door assembly comprising:
    an upper door assembly;
    at least one extension, said at least one extension is formed as a part of said upper door assembly;
    a trim molding connected to said upper door assembly;
    an extension formed as part of said trim molding;
    a lower door assembly;
    at least one lower connection point formed as part of said lower door assembly, wherein said extension formed as part of said upper door assembly and said extension formed as part of said trim molding are inserted into said lower connection point of said lower door assembly to individually secure said trim molding and said upper door assembly to said lower door assembly; and
    one or more fasteners between said trim molding and said upper door assembly removably connecting said trim molding to said upper door assembly.

9. The door assembly of claim 8, wherein said upper door assembly is at least partially constructed of a composite material.

10. The door assembly of claim 8, further comprising at least one attachment location formed as part of said upper door assembly having at least one receiving hole and said trim molding has at least one fastener that corresponds to said at least one receiving hole.

11. The door assembly of claim 8 further comprising an insert, wherein said insert is integrated with said upper door assembly, and said insert covers at least a portion of an interior of said upper door assembly.

12. The door assembly of claim 8, further comprising an attachment location molded into an interior side of said upper door assembly.

13. The door assembly of claim 8, said at least one lower connection point of said upper door assembly further comprising a receiver operable for receiving said extension formed as part of said trim molding and said extension formed as part of said upper door assembly such that said extension formed as part of said trim molding and said extension formed as part of said upper door assembly are adjacent one another when positioned in said receiver, thereby connecting said lower door assembly and said upper door assembly.

14. The door assembly of claim 8, further comprising said upper door assembly to have variable thicknesses.

* * * * *

UNITED STATES PATENT AND TRADEMARK OFFICE
CERTIFICATE OF CORRECTION

PATENT NO. : 7,634,873 B2 Page 1 of 1
APPLICATION NO. : 11/432889
DATED : December 22, 2009
INVENTOR(S) : Ruppert et al.

It is certified that error appears in the above-identified patent and that said Letters Patent is hereby corrected as shown below:

Column 1,
Line 10, "Many vehicles today have has been formed." should be -- Many vehicles today have interior trim molding mounted to the doors of the vehicle. In order to attach this trim molding to the door an additional manufacturing step is required after the door has been formed --.

Signed and Sealed this

Twenty-third Day of March, 2010

David J. Kappos
*Director of the United States Patent and Trademark Office*